US010027537B1

(12) United States Patent
Nice et al.

(10) Patent No.: US 10,027,537 B1
(45) Date of Patent: Jul. 17, 2018

(54) CONFIGURATION MANAGEMENT VIA SELF-AWARE MODEL

(71) Applicant: Amazon Technologies, Inc., Reno, NV (US)

(72) Inventors: Eryk Brian Nice, Medford, MA (US); James V. Schultz, Winchester, MA (US); Dinkar Chivaluri, Nashua, NH (US); Thomas A. Manning, Gloucester, MA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 14/489,389

(22) Filed: Sep. 17, 2014

(51) Int. Cl.
  *G06F 17/00* (2006.01)
  *H04L 12/24* (2006.01)
  *G06F 3/0484* (2013.01)

(52) U.S. Cl.
  CPC ...... *H04L 41/0803* (2013.01); *G06F 3/04842* (2013.01)

(58) Field of Classification Search
  CPC ............... G06F 3/0481; G06F 3/04842; G06F 17/30522; H04L 41/0803; G01C 21/3697; G06Q 30/0621

USPC .......................................................... 715/735
See application file for complete search history.

(56) References Cited

U.S. PATENT DOCUMENTS

| 9,008,858 | B1* | 4/2015 | Payne | B60H 1/00771 |
| | | | | 701/1 |
| 2009/0271609 | A1* | 10/2009 | Baskey | H04L 67/306 |
| | | | | 713/100 |
| 2014/0108384 | A1* | 4/2014 | Mule | H04L 41/0843 |
| | | | | 707/722 |
| 2015/0120490 | A1* | 4/2015 | Subbarayan | G06Q 30/0621 |
| | | | | 705/26.5 |

* cited by examiner

*Primary Examiner* — Scott Baderman
*Assistant Examiner* — Jason Edwards
(74) *Attorney, Agent, or Firm* — Kilpatrick Townsend & Stockton LLP

(57) ABSTRACT

Methods and systems for configuration management of computer applications implemented in different configurations use configuration parameters having assigned scopes of applicability. A method includes storing configuration parameters for a computer application for the different configurations. The stored configuration parameters have assigned scopes of applicability. At least one of the assigned scopes of applicability is selected and used to select a set of configuration parameters from the stored configuration parameters for application to a corresponding running instance of the computer application.

20 Claims, 9 Drawing Sheets

CONFIGURATION MANAGEMENT VIA SELF-AWARE MODEL

BACKGROUND

An electronic marketplace facilitates sales of items by multiple merchants through a common network site. Some electronic marketplaces may be associated with a fulfillment network. A merchant who participates in the electronic marketplace may be able to ship inventory to one or more fulfillment centers in the fulfillment network in order to outsource order fulfillment. The inventory of the merchant remains identified as owned by the merchant and separated from other products while being held at the fulfillment centers.

Each fulfillment center in a fulfillment network may employ a common computer application to control operational aspects of the fulfillment center. Such operational aspects can include, for example, control of automated order fulfillment systems. If the computer application is employed in different fulfillment centers, configuration parameters may vary to account for significant differences between the fulfillment centers. Such configuration parameters can number in the thousands. Additionally, different implementations of the computer application will typically have a unique set of configuration parameters with respect to individual configuration parameters and/or values assigned thereto. Accordingly, management of such configuration parameters can involve the expenditure of significant effort. Such expended effort can be increased even more due to additional complexity introduced by the existence of different software versions of the computer application and/or different computer platforms used to host the computer application.

BRIEF DESCRIPTION OF THE DRAWINGS

Various embodiments in accordance with the present disclosure will be described with reference to the drawings, in which.

DETAILED DESCRIPTION

Figure 1:
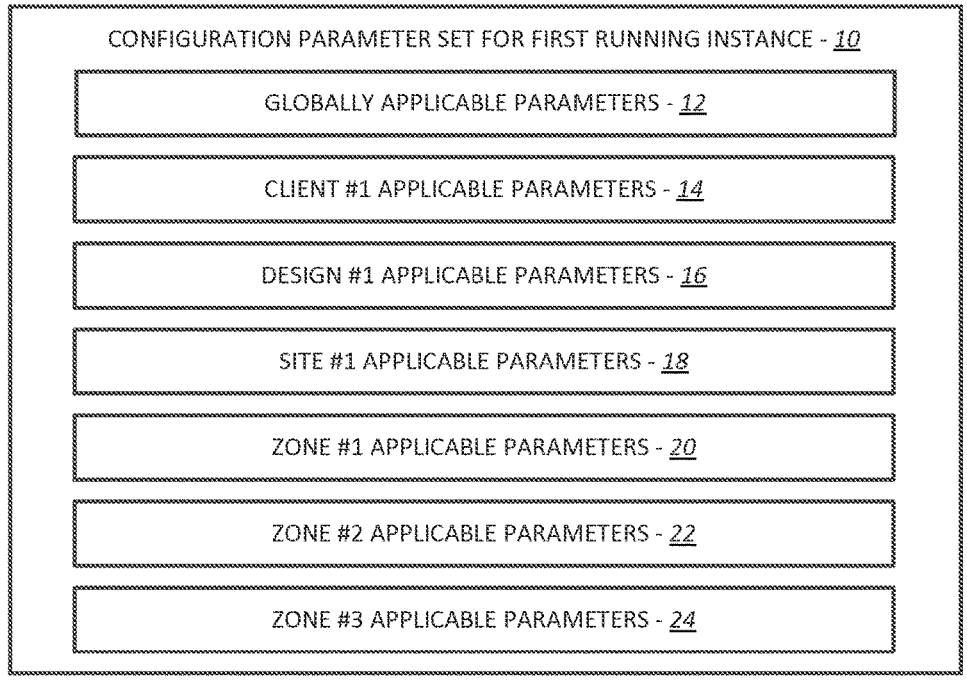
FIG. 1 and FIG. 2 are simplified schematic diagrams illustrating configuration parameter sets for example running instances of a computer application, in accordance with many embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The approaches and systems described herein are directed to multi-dimensional configuration management over a diverse set of implementations of a computer application. By employing a configuration structure in which individual configuration parameters have an assigned scope of applicability, redundant configuration management tasks can be substantially reduced.

For example, such multi-dimensional configuration management is described herein in the context of an order fulfillment management system for one or more materials handling facilities (MHFs), although one skilled in the art would understand that the various embodiments of the present invention are applicable to many other technical fields and systems beyond order fulfillment management systems that would benefit from multi-dimensional configuration management as described herein. An order fulfillment management system, like many software or hardware solutions, may have thousands (or more) of configuration parameters. Additionally, an order fulfillment management system may have dozens of different implementations with each having its own unique set of configuration parameters. These unique sets of configuration parameters, however, will typically share some common configuration parameters, depending on the similarity between the implementations. Unique sets of configuration parameters may arise due to aspects such as: 1) multiple MHF instances, or floors within a MHF, that are of a similar design (such relationships are typically, but not always, hierarchical); 2) multiple instances of the same MHF that are running on different platforms such as the cloud, a physical server, or in one of several virtual test environments where components of the system are emulated via software; and 3) varying software revisions, such as a current instance versus a version of configuration to be deployed with an upcoming release, or a configuration value used to work around bugs on specific software revisions.

In the context of an order fulfillment network, the approaches and systems described herein enable multi-dimensional configuration management across a diverse set of MHF implementations while minimizing redundant configuration management. For example, if a configuration parameter exists at multiple MHF sites, but should be set the same at all sites (e.g., its scope is global), only a single instance of that configuration parameter needs to be managed. Accordingly, by assigning a global scope of applicability to such a global configuration parameter, the configuration parameter can be automatically applied globally. In contrast, if a configuration parameter is local to a particular MHF, then all configuration instances in that MHF would share that configuration parameter value. By assigning a scope of applicability to the configuration parameter that is limited to the particular MHF, an attempt to use the same configuration design at another MHF can include an automatic determination that the local scope configuration parameter cannot be simply copied, but should instead be reset and/or reevaluated consistent with the applicable MHF. By assigning a scope of applicability to each of the configuration parameters, a scope-aware configuration model and framework is enabled.

The scope-aware configuration model and framework provides numerous benefits. For example, knowledge of the scopes of configuration parameters prevents inadvertent use of copied/cloned locally-limited configuration parameters on another instance of the computer application in which the locally-limited configuration parameters should not apply. Knowledge of the scopes of configuration parameters enables effort to be directed to only the configuration parameters that must be reset and/or reevaluated to create another configuration variant, such as when porting a production server configuration to the cloud. Accordingly, existing configuration parameters that have already been identified as being applicable to the new configuration variant can be used without expending any undue additional effort. Knowledge of the scopes of configuration parameters enables the detection and flagging of overrides and exceptions to the standard set of configuration parameters, including incorporation of overrides into the standard set of configuration parameters, or the tracking of the rollout of an updated set of configuration parameters to various instances of the computer application. Because the scope of applicability of each of the configuration parameters is known, configurations can be kept synchronized (e.g., using the same configuration library) across many instances, thereby avoiding the need to manually bring configurations to current or risk falling out of currency. For example, a quality assurance (QA) test environment can be kept current with a production implementation since the configuration model knows what configuration parameters to synchronize with non-QA implementations and what configuration parameters are locally applicable only to the specific QA environment.

In many embodiments, a configuration model is configured to increase efficiency of configuration management efforts. For example, in such a configuration model, each configuration parameter is assigned a scope of applicability that is specific to a tier in a hierarchical organization of scopes of applicability, and/or identifying its relationship with respect to other configuration dimensions, such as hosting computer platform and/or the software version of the computer application. Such a configuration model enables disambiguation regarding which configuration parameter value to use in the event of a conflict.

In many embodiments, a multiple-instance configuration management system is aware of the complete set of configuration parameters, which make up a whole configuration instance. In many embodiments, by specifying the applicable attributes of an implementation instance of the computer application (such as site, software version, platform, etc.), the system can select corresponding configuration parameters from a repository storing configuration parameters, each of which includes an assigned scope of applicability. The selected configuration parameters can include as complete a configuration set as can be generated from all known configurations. Remaining configuration parameters not included in the selected parameters can then be defined, for example, by a user of the configuration management system. Additionally, the system can audit selected configurations relative to a standard configuration for the selected configuration to identify any configuration parameter overrides that exist for the selected configuration for exception tracking.

Figure 2:
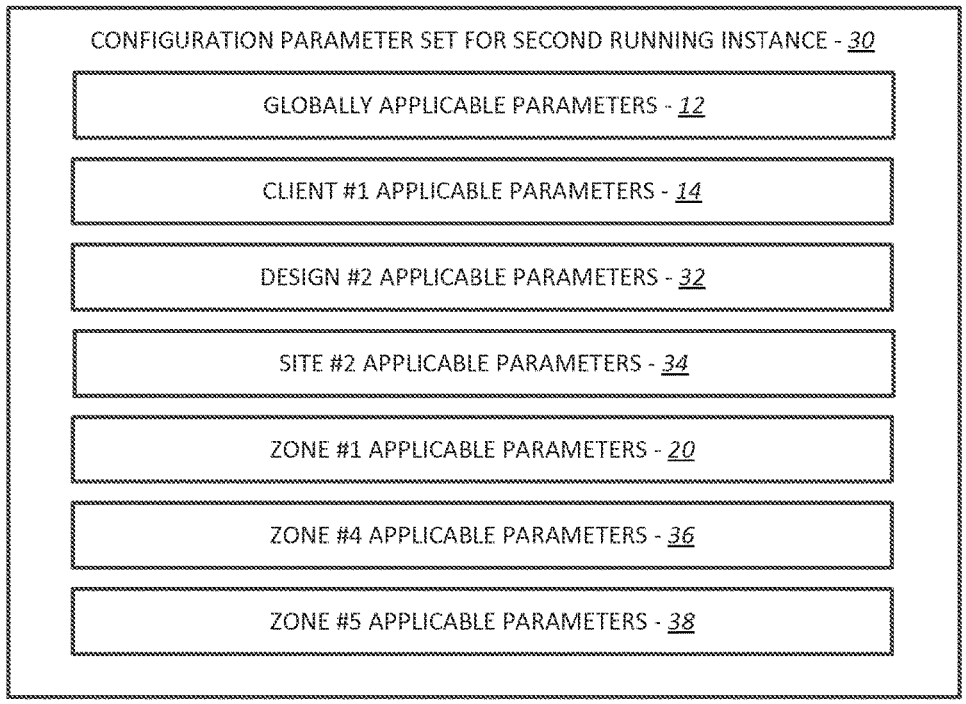

Turning now to the drawings in which the same reference numbers are used to refer to the same or similar elements, FIGS. 1 and 2 illustrate configuration parameter sets 10, 30 for example running instances of a computer application for controlling a materials management system, in accordance with many embodiments. In the illustrated examples, each of the configuration parameter sets includes parameters applicable to a specific running instance of the computer program. To accommodate variation between respective materials management systems that can be controlled by the computer application, different configuration parameters and/or settings thereof can be employed in different configuration parameter sets. Also, as a result of commonality between respective materials management systems that can be controlled by the computer application, the same configuration parameters and/or settings can be employed in different configuration parameter sets.

For example, each of the illustrated example configuration parameter sets 10, 30 includes: 1) configuration parameters that are globally applicable in all running instances of the computer application, 2) parameters that are applicable to a specific client operating one or more versions of the materials management system, 3) parameters that are applicable to a specific design of the materials management system, 4) parameters that are applicable to a specific site of the materials management system, and 5) parameters that are applicable to one of more zones of the specific materials management system being controlled by the computer program. For the first running instance of the computer program, the materials management system controlled by the computer program is operated by a client designated client #1, has a system design designated design #1, has a site designated site #1, and has three zones designated zones #1, #2, and #3. The configuration parameter set 10 for the first running instance includes globally applicable parameters 12, parameters that are not globally applicable but are applicable to all running instances of the computer program for client #1 (client #1 applicable parameters 14), parameters applicable to design #1 (design #1 applicable parameters 16), parameters applicable to site #1 (site #1 applicable parameters 18) and parameters that are applicable to the three designated zones (zone # applicable parameters 20, 22, 24). For the second running instance of the computer program, the materials management system controlled by the computer program is operated by the same client #1, has a different system design (designated design #2), has a different site (designated site #2) and has one common zone and two different zones (zones #1, #4, and #5). The configuration parameter set 30 for the second running instance includes globally applicable parameters 12, parameters that are not globally applicable but are applicable to all running instances of the computer program for client #1 (client #1 applicable parameters 14), parameters applicable to design #2 (design #2 applicable parameters 32), parameters applicable to site #2 (site #2 applicable parameters 34) and parameters that are applicable to the three designated zones (zone number applicable parameters 20, 36, 38). In the illustrated examples, the first and second running instances differ with respect to the use of different designs, different sites and some different zones. Specifically, the first running instance employs, in part, design #1 applicable parameters 16, site #1 applicable parameters 18, zone #2 applicable parameters 22, and zone #3 applicable parameters 24, whereas, in contrast, the second running instance employs, in corresponding part, design #2 applicable parameters 32, site #2 applicable parameters 34, zone #4 applicable parameters 36, and zone #5 applicable parameters 38, respectively.

In many embodiments, the creation of a parameter set for a desired running instance includes the specification of one or more scopes of applicability for the desired running instance (e.g., client, design, and/or zone(s)). The specified one or more scopes of applicability are then used to select configuration parameters from a store of configuration parameters having matching assigned scopes of applicability. For example, for the illustrated example first running instance, the creation of the configuration parameter set 10 for the first running instance can begin with a specification of the desired client (client #1), a specification of the desired design (design #1), a specification of a desired site (site #1), and a specification of the desired zones (zones #1, #2, and #3). The specified scopes of applicability (client #1; design #1; site #1; and zones #1, #2, and #3) can then be used to select matching configuration parameters from the stored configuration parameters for application to the first running instance of the computer program. Likewise, for the illustrated example second running instance, the creation of the configuration parameter set 30 for the second running instance can begin with a specification of the desired client (client #1), a specification of the desired design (design #2), a specification of a desired site (site #2), and a specification of the desired zones (zones #1, #4, and #5). The specified scopes of applicability (client #1; design #2; site #2; and zones #1, #4, and #5) can then be used to select matching configuration parameters from the stored configuration parameters for application to the second running instance of the computer program. While both the first and second running instances employ multiple zones, a running instance running a single zone is also possible.

As described herein, the scopes of applicability employed can have a hierarchical organization in which the specification of a lower level scope of applicability results in the automatic selection of corresponding higher levels of applicability. For example, a particular design may be employed only by a particular client. Therefore, selection of the particular design can result in automatic selection of the client employing the particular design.

Figure 3:
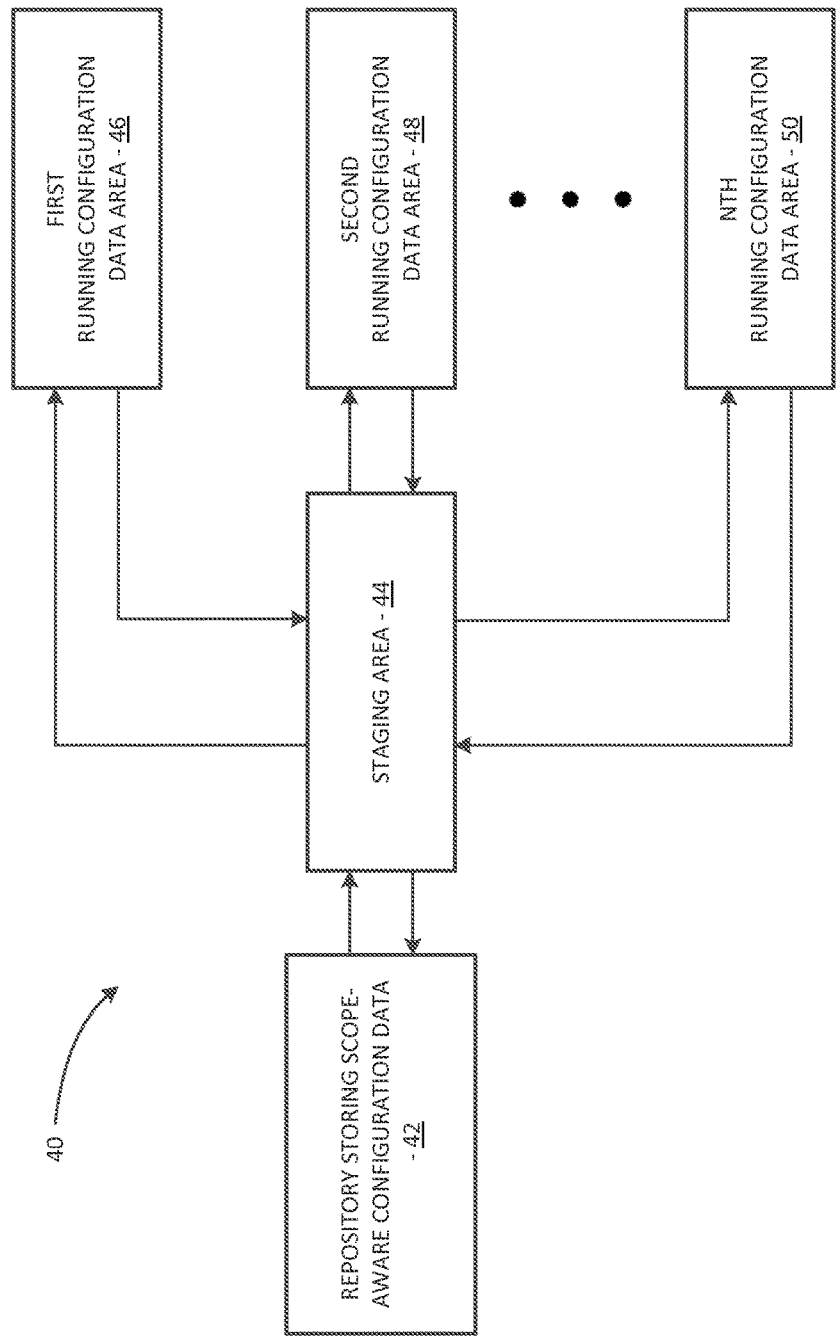
FIG. 3 and FIG. 4 are simplified schematic diagrams illustrating data areas of a system configured to manage configuration parameters for a computer application implemented in a plurality of different configurations, in accordance with many embodiments.

FIG. 3 illustrates data areas 40 of a system configured to manage configuration parameters for a computer application implemented in a plurality of different configurations, in accordance with many embodiments. In many embodiments, each configuration parameter includes a configuration parameter identification and can be assigned a value suitable to the configuration parameter. The data areas 40 include a configuration data repository 42, a staging area 44, and a plurality of running configuration data areas 46, 48, 50.

The configuration data repository 42 stores scope-aware configuration data from which at least part of a set of configuration parameters for a running configuration can be generated. The configuration data stored in the repository 42 is a superset of configuration data and can include metadata indicating the scope of applicability of many, if not all, of the configuration parameters stored therein, such as whether each configuration parameter is globally applicable, locally applicable, applicable to a particular software version of the computer application, and/or applicable to a particular platform for hosting the computer application. In many embodiments, the repository 42 is version controlled, for example, relative to the software version of the computer application.

In many embodiments, the configuration data stored in the repository 42 is not in a form that can be directly deployed to one of the running configurations 46, 48, 50. The staging area 44 can be used to construct configuration parameter files/databases that can be applied to a particular running configuration (e.g., one of running configurations 46, 48, 50). For example, as will be described in further detail herein, one or more scopes of applicability can be specified for the particular running configuration and used to load applicable configuration parameters from the repository 42 into the staging area 44. Because the configuration data stored within the repository 42 is scope-aware, which includes knowledge of what constitutes a complete set of configuration parameters for a specified software version and host computer platform, all configuration parameters remaining to be defined (i.e., all configuration parameters included in the complete set of configuration parameters that were not already loaded from the repository 42 into the staging area 44) can be identified to enable prompting for associated properties and/or values that need to be set for the remaining configuration parameters. Once the complete set of configuration parameters for a particular running configuration have been selected and/or defined, the configuration parameters set can be transferred from the staging area 44 to the particular running configuration data area.

Additionally, the complete set of configuration parameters for a particular running configuration can be used to audit the configuration parameters of a selected one of the running configurations 46, 48, 50. For example, the configuration parameters for the selected running configuration can be copied into the staging area and compared to the assembled configuration parameters set to identify and/or flag any differences found therebetween. Any differences found can be used to selectively update the configuration data stored in the repository 42 to reflect desired changes (e.g., overrides or exceptions such as bug fixes).

Figure 4:
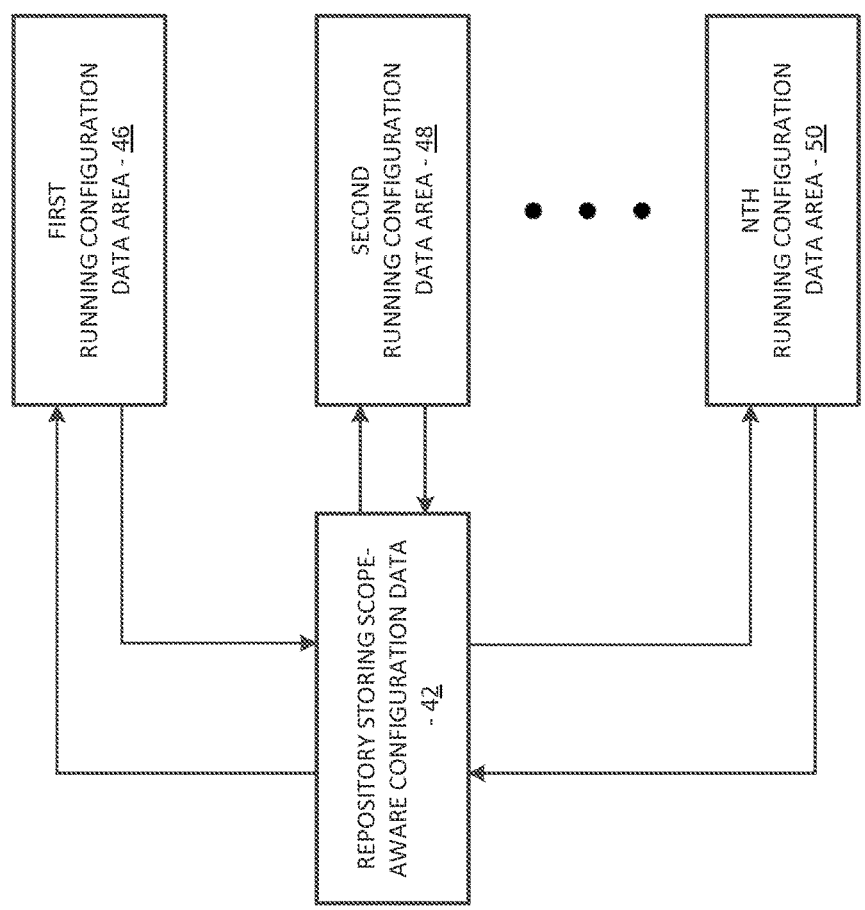

FIG. 4 shows an alternate configuration of the data areas that does not include the staging area 44. In this alternate arrangement, one or more scopes of applicability can be specified for a particular running instance of the computer application and used to load applicable configuration parameters from the repository 42 directly to the particular running configuration data area. Because the configuration data stored within the repository 42 is scope-aware, which includes knowledge of what constitutes a complete set of configuration parameters for a specified software version and host computer platform, all configuration parameters remaining to be defined (i.e., all configuration parameters included in the complete set of configuration parameters that were not already loaded from the repository 42 into the particular running configuration data area) can be identified to enable prompting for associated properties and/or values that need to be set for the remaining configuration parameters.

Figure 5:
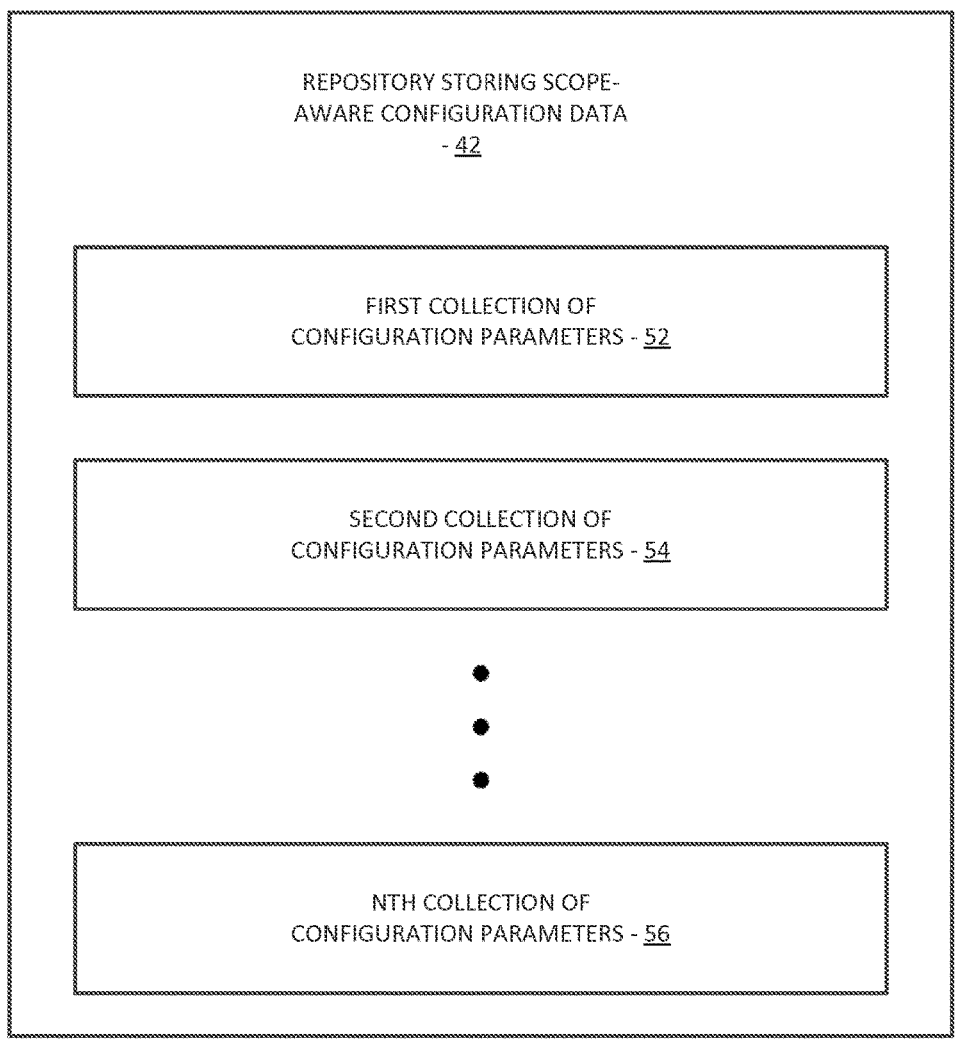
FIG. 5 is a simplified schematic diagram illustrating a data repository storing scope-aware configuration data, in accordance with many embodiments.

FIG. 5 shows an example organization of configuration data within the repository 42 to provide version control. As illustrated, the repository 42 stores any suitable number of collections (e.g., sets) of configuration parameters 52, 54, 56. The configuration parameter collections 52, 54, 56 can correspond to any suitable organization of configuration parameters for variations related to implementation of the computer application including, but not limited to, (a) computer platforms on which the computer application can be hosted, (b) software versions for the computer application, (c) the environment for the computer application (e.g., production or test), and (d) a time frame for the configuration (e.g., a current time frame or a prior time frame such as for a previously archived configuration parameters set for a previously running instance of the computer application). The number, names, values, and scopes of applicability of the configuration parameters can vary between the configuration parameter collections 52, 54, 56. Such variation between the configuration parameter collections 52, 54, 56 can be used to account for differences in configuration parameters for different platforms, software versions, environment, and time frame. For example, many software releases have new capabilities that require new configuration parameters. A software release can be tested on a test environment computer platform and the new parameters configured. After testing, the new configuration parameters can be added to the repository 52 to enable selection for application to one or more production environments during an upgrade process.

Figure 6:
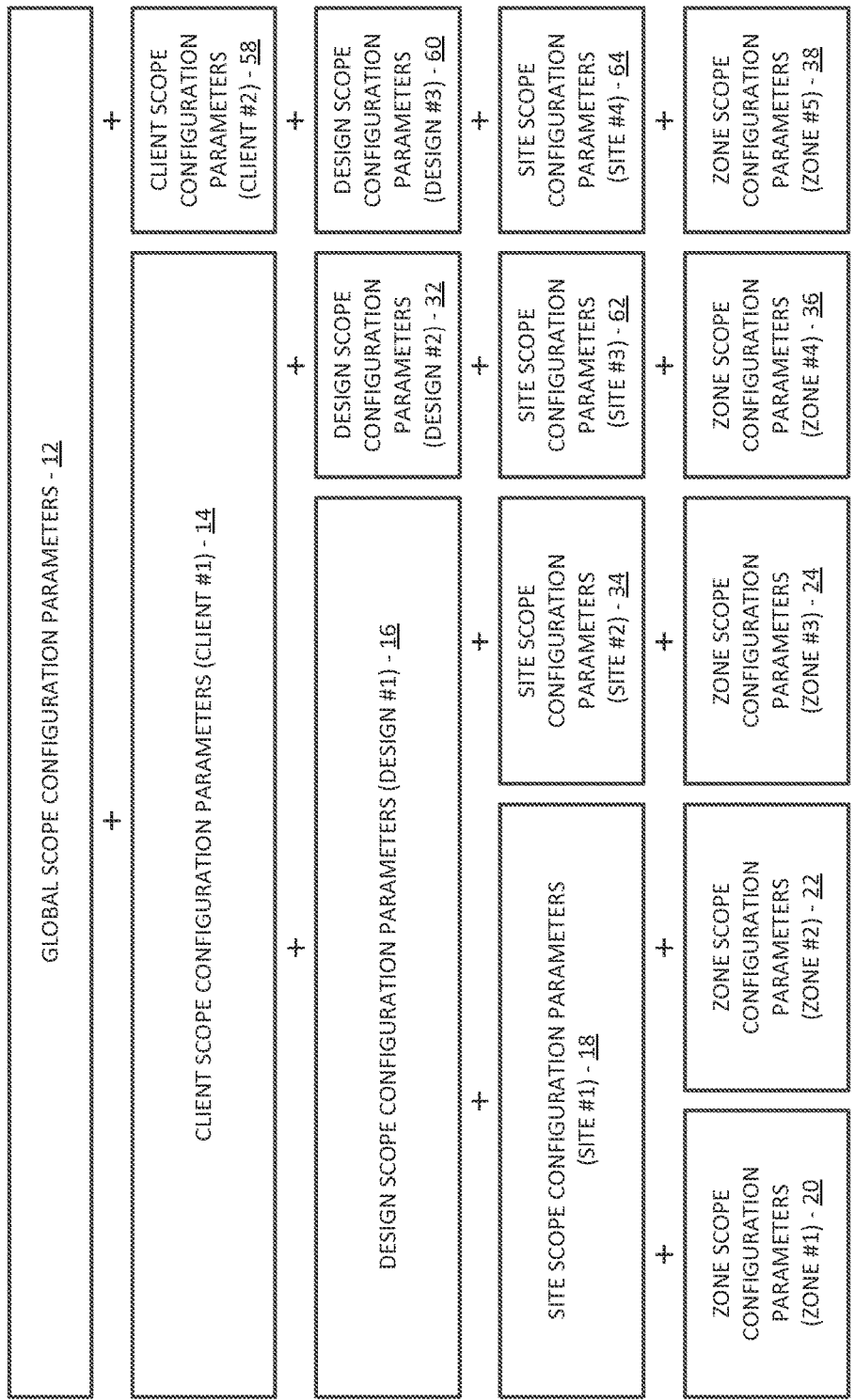
FIG. 6 is a simplified schematic diagram illustrating example scopes of applicability assignable to configuration parameters, in accordance with many embodiments.

FIG. 6 shows an example of scopes of applicability for the scope-aware configuration data stored in the repository 42. The scopes of applicability can have a hierarchical organization that allows the selection of a lower-level scope of applicability to result in the selection of configuration parameters having the selected scope of applicability as well as all configuration parameters having hierarchically related higher-level scopes of applicability. While FIG. 6 shows particular numbers of items and/or values for any particular level of scope of applicability, the number of items and/or values for any of the levels can be varied in any suitable manner to account for variations between running instances of the computer application employing the configuration parameters.

In the example organization, each of the configuration parameters are identified as being one of: (1) global scope configuration parameters 12; (2) client scope configuration parameters 14, 58; (3) design scope configuration parameters 16, 32, 60; (4) site scope configuration parameters 18, 34, 62, 64; and (5) zone scope configuration parameters 20, 22, 24, 36, 38. Different numbers and types of levels of scope are possible, other than those illustrated in this example. Each of the global scope configuration parameters has a value applicable to all instances of the computer application.

The client scope can be a hierarchical level immediately below the global scope. Each of the configuration parameters for a particular client scope configuration parameters set 14, 58 has a value applicable to all installations of a corresponding client. In the context of a MHF system, a client can be a particular merchant of merchandise being sold via the MHF. Configuration parameters can be used to control operational characteristics of the MHF in accordance with the expressed directions of a particular client. For example, one client may always want some product scan validation feature enabled, while another client may always want the same product scan validation feature disabled. As another example, configuration parameters can be used to identify what servers to communicate with to receive orders and send status messages for a particular client. While only two client scope configuration parameters sets 14, 58 are shown, any suitable number of client scope configuration parameters sets can be used.

The design scope can be a hierarchical level immediately below the client scope. Each client can have any suitable number of designs associated with the client. Each of the configuration parameters for a particular design scope configuration parameters set 16, 32, 60 has a value applicable to all installations of a corresponding design of a system employing the configuration parameters. For example, in the context of a fulfillment network, a client (e.g., an operator of the fulfillment network corresponding to the client scope configuration parameters 14) may employ different warehouse designs to which the design scope configuration parameters sets 16, 32 are applicable. In the illustrated example, each of the configuration parameters of the design scope configuration parameters set 16 has a value applicable to a first design for the client and each of the configuration parameters of the design scope configuration parameters set 32 has a value applicable to a second design for the client. In the context of a fulfillment center, design scope configuration parameters can be used to define aspects such as types of inventory containers, fulfillment methods, replenishment methods, inventory station models, etc.

The site scope can be a hierarchical level immediately below the design scope. Each design can have any suitable number of sites associated with the design. Each of the configuration parameters for a particular site scope configuration parameters set 18, 34, 62, 66 has a value applicable to all installations of a corresponding site of a system employing the configuration parameters. For example, in the context of a fulfillment network, a warehouse design (e.g., a first design of the fulfillment network corresponding to the design scope configuration parameters 16) may employ different warehouse sites to which the site scope configuration parameters sets 18, 34 are applicable. In the illustrated example, each of the configuration parameters of the site scope configuration parameters set 18 has a value applicable to a first site and each of the configuration parameters of the site scope configuration parameters set 34 has a value applicable to a second site.

The zone scope can be a hierarchical level immediately below the site scope. Each site can have any suitable number of zones associated with the site. Each of the configuration parameters for a particular zone scope configuration parameters set 20, 22, 24, 36, 38 has a value applicable to all installations of a corresponding zone of a system employing the configuration parameters. For example, in the context of a fulfillment network, a site (e.g., a first site of the fulfillment network corresponding to the site scope configuration parameters set 18) may employ different zones to which the zone scope configuration parameters sets 20, 22 are applicable. In the illustrated example, each of the configuration parameters of the zone scope configuration parameters set 20 has a value applicable to a first zone and each of the configuration parameters of the zone scope configuration parameters set 22 has a value applicable to a second zone.

Any suitable approach can be used to associate a scope of applicability with a configuration parameter. For example, metadata can be used to provide configuration parameter to scope mapping. As another example, a data table having parameter identification, parameter value, and parameter scope for each configuration parameter entry can be used.

Hierarchical organization of the scopes of applicability for the scope-aware configuration parameters of FIG. 6 can be used to enable automatic selection of higher level configuration parameters. For example, selection of the zone scope configuration parameters 22 corresponding to the second zone can enable automatic selection of the related higher level configuration parameters, which include the site scope configuration parameters 18 for the first site, the design scope configuration parameters 16 for the first design, the client scope configuration parameters 14 for the first client, and the global scope configuration parameters 12. The selected zone scope configuration parameters, site scope configuration parameters, design scope configuration parameters, client scope configuration parameters, and the global scope configuration parameters can then be loaded into the staging area 44 and any remaining configuration parameters can be defined, for example, by prompting for user input. In a similar fashion, selection of a site scope configuration parameters set can be used to enable automatic selection of related higher level configuration parameters, which include the related design scope, client scope, and global scope configuration parameters. Alternatively, any other level of scope-aware configuration parameters can be selected, which may be followed by defining and/or selecting values for any configuration parameters that remain to be determined, for example, by prompting for user input.

While the example scopes of applicability for the scope-aware configuration parameters of FIG. 6 can be hierarchical in organization, any suitable organization can be used including non-hierarchical organizations. When non-hierarchical organization is used, explicit selection of at least one scope of applicability can be used in the absence of automatic selection enabled by a hierarchical organization. Any remaining configuration parameters not determined by the selected scope of applicability can be defined, for example, by prompting for user input. Additionally, configuration parameters sets applicable to particular implementation variables (e.g., host platform, software version of the computer application, production or test implementation environment, and/or time frame such as current or prior time frame) can be used, thereby enabling selection of configuration parameters from the repository 42 suitable for a designated implementation variation.

Figure 7:
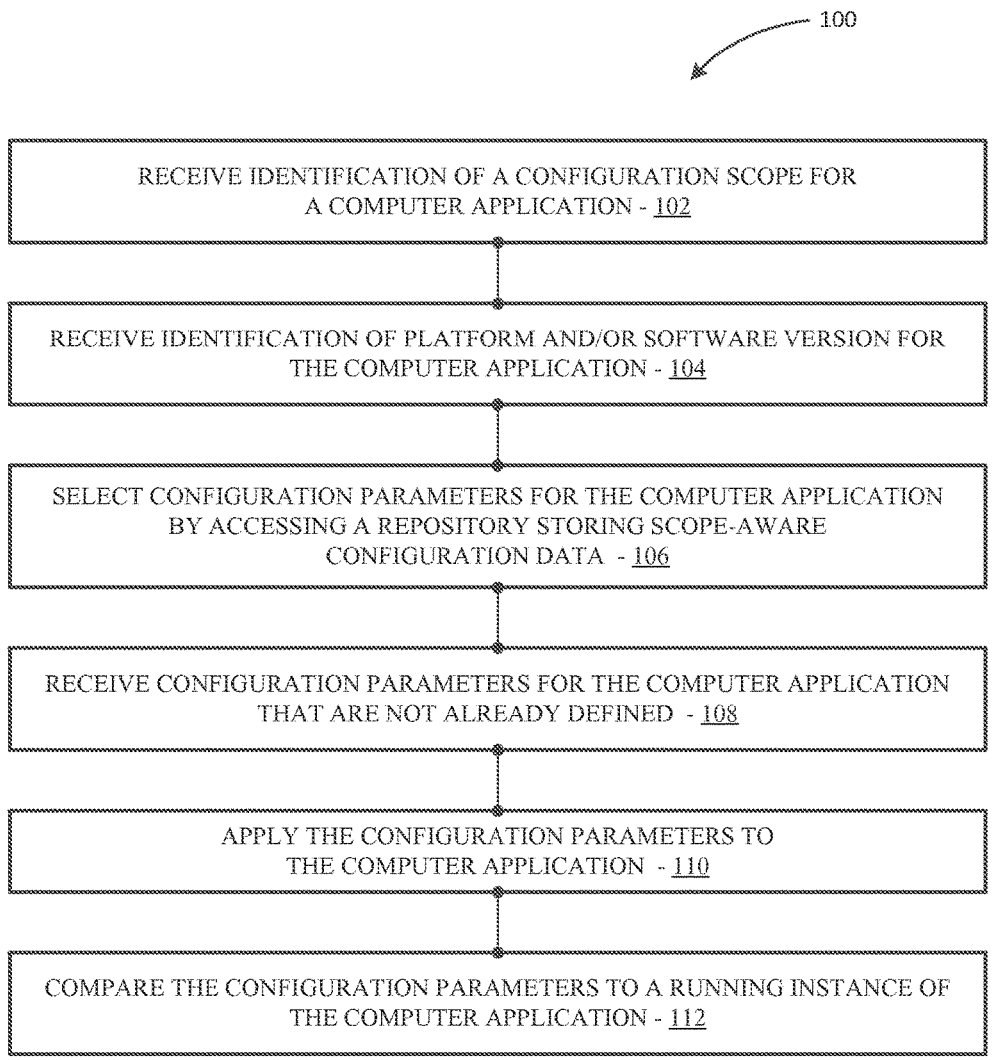
FIG. 7 is a simplified schematic diagram of a process for managing configuration parameters for a computer application implementable in a plurality of different configurations, in accordance with many embodiments.

FIG. 7 is a simplified schematic diagram of a process 100 for managing configuration parameters for a computer application implementable in a plurality of different configurations, in accordance with many embodiments. Some or all of the process 100 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 100 includes receiving identification of a configuration scope for a computer application (act 102). For example, the identified scope can be any of the configuration scopes illustrated in FIG. 6 and described herein.

In act 104, identification of a computer platform for hosting the computer application and/or identification a software version for the computer application are received. For example, the computer platform that will host the computer application can be identified as one of a particular test platform, development platform, or production platform.

In act 106, configuration parameters corresponding to the identified configuration scope, computer platform and/or software version of the computer application are selected by accessing a repository (e.g., repository 42) storing scope-aware configuration data. The identified scope, software version and/or computer platform information is used to select applicable configuration parameters and associated values from the repository 42.

In act 108, configuration parameters not already defined for the identified system are prompted for and received. For example, by comparing the configuration parameters obtained in act 106 with a complete list of configuration parameters associated with the identified system, configuration parameters can be identified that remain to be defined. A user can then be prompted to define the identified remaining configuration parameters.

In act 110, the configuration parameters provided in act 106 and/or defined in act 108 can be applied to the identified system. For example, a complete configuration parameters set assembled and stored in the staging area 44 can be copied and/or provided to one of the running configuration data areas 46, 48, 50.

In act 112, the configuration parameters provided in act 106 and/or defined in act 108 can be compared to configuration parameters already being used in an instance of the computer application. For example, a complete configuration parameters set assembled and stored in the staging area 44 can be compared to configuration parameters obtained from one of the running configuration data areas 46, 48, 50 to identify differences therebetween. The identified differences can be assessed and used to take appropriate subsequent action. For example, the identified differences can be used to correct or update the data repository, identify errors in the data repository, correct or update any running configuration data areas, apply corrections or updates to any other running configuration data areas that may be using configuration parameters with the same scope, and other actions. Additionally, selected configuration parameters can be overridden with different assigned values prior to use of the assembled configuration parameters set.

The approaches and systems described herein can be used in connection with any suitable computer application that is implemented in different configurations so as to employ different configuration parameters sets. An example of such a suitable computer application is an order fulfillment computer application used to control an automated order fulfillment system as illustrated in FIG. 8 through FIG. 11 and described herein.

Example System Suitable for Multiple-Instance Configuration Management

Figure 8:
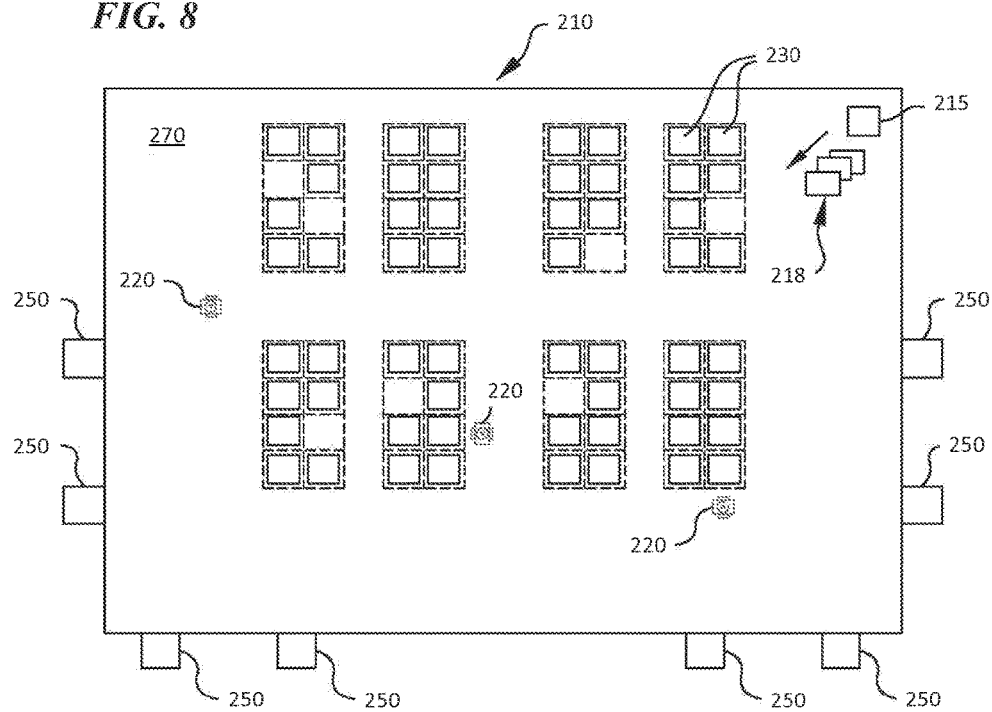
FIG. 8 illustrates components of an inventory system according to an embodiment.

FIG. 8 illustrates the contents of an inventory system 210. Inventory system 210 includes a management module 215, one or more mobile drive units 220, one or more inventory holders 230, and one or more inventory stations 250. Mobile drive units 220 transport inventory holders 230 between points within a workspace 270 in response to commands communicated by management module 215. Each inventory holder 230 stores one or more types of inventory items. As a result, inventory system 210 is capable of moving inventory items between locations within workspace 270 to facilitate the entry, processing, and/or removal of inventory items from inventory system 210 and the completion of other tasks involving inventory items.

Management module 215 assigns tasks to appropriate components of inventory system 210 and coordinates operation of the various components in completing the tasks. These tasks may relate not only to the movement and processing of inventory items, but also to the management and maintenance of the components of inventory system 210. For example, management module 215 may assign portions of workspace 270 as parking spaces for mobile drive units 220, the scheduled recharge or replacement of mobile drive unit batteries, the storage of empty inventory holders 230, or any other operations associated with the functionality supported by inventory system 210 and its various components. Management module 215 may select components of inventory system 210 to perform these tasks and communicate appropriate commands and/or data to the selected components to facilitate completion of these operations. Although shown in FIG. 8 as a single, discrete component, management module 215 may represent multiple components and may represent or include portions of mobile drive units 220 or other elements of inventory system 210. As a result, any or all of the interactions between a particular mobile drive unit 220 and management module 215 that are described below may, in particular embodiments, represent peer-to-peer communications between that mobile drive unit 220 and one or more other mobile drive units 220. The contents and operation of an example embodiment of management module 215 are discussed further below with respect to FIG. 8.

Mobile drive units 220 move inventory holders 230 between locations within workspace 270. Mobile drive units 220 may represent any devices or components appropriate for use in inventory system 210 based on the characteristics and configuration of inventory holders 230 and/or other elements of inventory system 210. In a particular embodiment of inventory system 210, mobile drive units 220 represent independent, self-powered devices configured to freely move about workspace 270. In alternative embodiments, mobile drive units 220 represent elements of a tracked inventory system configured to move inventory holders 230 along tracks, rails, cables, crane system, or other guidance or support elements traversing workspace 270. In such an embodiment, mobile drive units 220 may receive power and/or support through a connection to the guidance elements, such as a powered rail. Additionally, in particular embodiments of inventory system 210 mobile drive units 220 may be configured to utilize alternative conveyance equipment to move within workspace 270 and/or between separate portions of workspace 270. The contents and operation of an example embodiment of a mobile drive unit 220 are discussed further below with respect to FIG. 10.

Additionally, mobile drive units 220 may be capable of communicating with management module 215 to receive information identifying selected inventory holders 230, transmit the locations of mobile drive units 220, or exchange any other suitable information to be used by management module 215 or mobile drive units 220 during operation. Mobile drive units 220 may communicate with management module 215 wirelessly, using wired connections between mobile drive units 220 and management module 215, and/or in any other appropriate manner. As one example, particular embodiments of mobile drive unit 220 may communicate with management module 215 and/or with one another using 802.11, Bluetooth, or Infrared Data Association (IrDA) standards, or any other appropriate wireless communication protocol. As another example, in a tracked inventory system 210, tracks or other guidance elements upon which mobile drive units 220 move may be wired to facilitate communication between mobile drive units 220 and other components of inventory system 210. Furthermore, as noted above, management module 215 may include components of individual mobile drive units 220. Thus, for the purposes of this description and the claims that follow, communication between management module 215 and a particular mobile drive unit 220 may represent communication between components of a particular mobile drive unit 220. In general, mobile drive units 220 may be powered, propelled, and controlled in any manner appropriate based on the configuration and characteristics of inventory system 210.

Inventory holders 230 store inventory items. In a particular embodiment, inventory holders 230 include multiple storage bins with each storage bin capable of holding one or more types of inventory items. Inventory holders 230 are capable of being carried, rolled, and/or otherwise moved by mobile drive units 220. In particular embodiments, inventory holder 230 may provide additional propulsion to supplement that provided by mobile drive unit 220 when moving inventory holder 230.

Additionally, in particular embodiments, inventory items may also hang from hooks or bars (not shown) within or on inventory holder 230. In general, inventory holder 230 may store inventory items in any appropriate manner within inventory holder 230 and/or on the external surface of inventory holder 230.

Additionally, each inventory holder 230 may include a plurality of faces, and each bin may be accessible through one or more faces of the inventory holder 230. For example, in a particular embodiment, inventory holder 230 includes four faces. In such an embodiment, bins located at a corner of two faces may be accessible through either of those two faces, while each of the other bins is accessible through an opening in one of the four faces. Mobile drive unit 220 may be configured to rotate inventory holder 230 at appropriate times to present a particular face and the bins associated with that face to an operator or other components of inventory system 210.

Inventory items represent any objects suitable for storage, retrieval, and/or processing in an automated inventory system 210. For the purposes of this description, "inventory items" may represent any one or more objects of a particular type that are stored in inventory system 210. Thus, a particular inventory holder 230 is currently "storing" a particular inventory item if the inventory holder 230 currently holds one or more units of that type. As one example, inventory system 210 may represent a mail order warehouse facility, and inventory items may represent merchandise stored in the warehouse facility. During operation, mobile drive units 220 may retrieve inventory holders 230 containing one or more inventory items requested in an order to be packed for delivery to a customer or inventory holders 230 carrying pallets containing aggregated collections of inventory items for shipment. Moreover, in particular embodiments of inventory system 210, boxes containing completed orders may themselves represent inventory items.

In particular embodiments, inventory system 10 may also include one or more inventory stations 250. Inventory stations 250 represent locations designated for the completion of particular tasks involving inventory items. Such tasks may include the removal of inventory items from inventory holders 230, the introduction of inventory items into inventory holders 230, the counting of inventory items in inventory holders 230, the decomposition of inventory items (e.g., from pallet- or case-sized groups to individual inventory items), the consolidation of inventory items between inventory holders 230, and/or the processing or handling of inventory items in any other suitable manner. In particular embodiments, inventory stations 250 may just represent the physical locations where a particular task involving inventory items can be completed within workspace 270. In alternative embodiments, inventory stations 250 may represent both the physical location and also any appropriate equipment for processing or handling inventory items, such as scanners for monitoring the flow of inventory items in and out of inventory system 210, communication interfaces for communicating with management module 215, and/or any other suitable components. Inventory stations 250 may be controlled, entirely or in part, by human operators or may be fully automated. Moreover, the human or automated operators of inventory stations 250 may be capable of performing certain tasks to inventory items, such as packing, counting, or transferring inventory items, as part of the operation of inventory system 210.

Workspace 270 represents an area associated with inventory system 210 in which mobile drive units 220 can move and/or inventory holders 230 can be stored. For example, workspace 270 may represent all or part of the floor of a mail-order warehouse in which inventory system 210 operates. Although FIG. 8 shows, for the purposes of illustration, an embodiment of inventory system 210 in which workspace 270 includes a fixed, predetermined, and finite physical space, particular embodiments of inventory system 210 may include mobile drive units 220 and inventory holders 230 that are configured to operate within a workspace 270 that is of variable dimensions and/or an arbitrary geometry. While FIG. 8 illustrates a particular embodiment of inventory system 210 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure.

In operation, management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of mobile drive units 220, inventory holders 230, inventory stations 250 and other components of inventory system 210. Depending on the component and the task to be completed, a particular task assignment 218 may identify locations, components, and/or actions associated with the corresponding task and/or any other appropriate information to be used by the relevant component in completing the assigned task.

In particular embodiments, management module 215 generates task assignments 218 based, in part, on inventory requests that management module 215 receives from other components of inventory system 210 and/or from external components in communication with management module 215. These inventory requests identify particular operations to be completed involving inventory items stored or to be stored within inventory system 210 and may represent communication of any suitable form. For example, in particular embodiments, an inventory request may represent a shipping order specifying particular inventory items that have been purchased by a customer and that are to be retrieved from inventory system 210 for shipment to the customer. Management module 215 may also generate task assignments 218 independently of such inventory requests, as part of the overall management and maintenance of inventory system 210. For example, management module 215 may generate task assignments 218 in response to the occurrence of a particular event (e.g., in response to a mobile drive unit 220 requesting a space to park), according to a predetermined schedule (e.g., as part of a daily start-up routine), or at any appropriate time based on the configuration and characteristics of inventory system 210. After generating one or more task assignments 218, management module 215 transmits the generated task assignments 218 to appropriate components for completion of the corresponding task. The relevant components then execute their assigned tasks.

With respect to mobile drive units 220 specifically, management module 215 may, in particular embodiments, communicate task assignments 218 to selected mobile drive units 220 that identify one or more destinations for the selected mobile drive units 220. Management module 215 may select a mobile drive unit 220 to assign the relevant task based on the location or state of the selected mobile drive unit 220, an indication that the selected mobile drive unit 220 has completed a previously-assigned task, a predetermined schedule, and/or any other suitable consideration. These destinations may be associated with an inventory request the management module 215 is executing or a management objective the management module 215 is attempting to fulfill. For example, the task assignment may define the location of an inventory holder 230 to be retrieved, an inventory station 250 to be visited, a storage location where the mobile drive unit 220 should park until receiving another task, or a location associated with any other task appropriate based on the configuration, characteristics, and/or state of inventory system 210, as a whole, or individual components of inventory system 210. For example, in particular embodiments, such decisions may be based on the popularity of particular inventory items, the staffing of a particular inventory station 250, the tasks currently assigned to a particular mobile drive unit 220, and/or any other appropriate considerations.

As part of completing these tasks mobile drive units 220 may dock with and transport inventory holders 230 within workspace 270. Mobile drive units 220 may dock with inventory holders 230 by connecting to, lifting, and/or otherwise interacting with inventory holders 230 in any other suitable manner so that, when docked, mobile drive units 220 are coupled to and/or support inventory holders 230 and can move inventory holders 230 within workspace 270. While the description below focuses on particular embodiments of mobile drive unit 220 and inventory holder 230 that are configured to dock in a particular manner, alternative embodiments of mobile drive unit 220 and inventory holder 230 may be configured to dock in any manner suitable to allow mobile drive unit 220 to move inventory holder 230 within workspace 270. Additionally, as noted below, in particular embodiments, mobile drive units 220 represent all or portions of inventory holders 230. In such embodiments, mobile drive units 220 may not dock with inventory holders 230 before transporting inventory holders 230 and/or mobile drive units 220 may each remain continually docked with a particular inventory holder 230.

While the appropriate components of inventory system 210 complete assigned tasks, management module 215 may interact with the relevant components to ensure the efficient use of space, equipment, manpower, and other resources available to inventory system 210. As one specific example of such interaction, management module 215 is responsible, in particular embodiments, for planning the paths mobile drive units 220 take when moving within workspace 270 and for allocating use of a particular portion of workspace 270 to a particular mobile drive unit 220 for purposes of completing an assigned task. In such embodiments, mobile drive units 220 may, in response to being assigned a task, request a path to a particular destination associated with the task. Moreover, while the description below focuses on one or more embodiments in which mobile drive unit 220 requests paths from management module 215, mobile drive unit 220 may, in alternative embodiments, generate its own paths.

Components of inventory system 210 may provide information to management module 215 regarding their current state, other components of inventory system 210 with which they are interacting, and/or other conditions relevant to the operation of inventory system 210. This may allow management module 215 to utilize feedback from the relevant components to update algorithm parameters, adjust policies, or otherwise modify its decision-making to respond to changes in operating conditions or the occurrence of particular events.

In addition, while management module 215 may be configured to manage various aspects of the operation of the components of inventory system 210, in particular embodiments, the components themselves may also be responsible for decision-making relating to certain aspects of their operation, thereby reducing the processing load on management module 215.

Thus, based on its knowledge of the location, current state, and/or other characteristics of the various components of inventory system 210 and an awareness of all the tasks currently being completed, management module 215 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 210 may be able to support a number of techniques for efficiently executing various aspects of the operation of inventory system 210. As a result, particular embodiments of management module 215 may, by implementing one or more management techniques described below, enhance the efficiency of inventory system 210 and/or provide other operational benefits.

Figure 9:
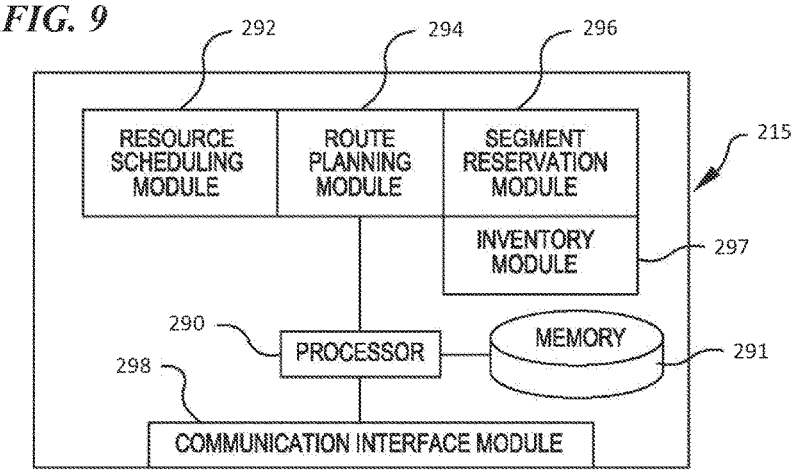
FIG. 9 illustrates in greater detail the components of an example management module that may be utilized in the inventory system shown in FIG. 8.

FIG. 9 illustrates in greater detail the components of a particular embodiment of management module 215. As shown, the example embodiment includes a resource scheduling module 292, a route planning module 294, a segment reservation module 296, an inventory module 297, a communication interface module 298, a processor 290, and a memory 291. Management module 215 may represent a single component, multiple components located at a central location within inventory system 210, or multiple components distributed throughout inventory system 210. For example, management module 215 may represent components of one or more mobile drive units 220 that are capable of communicating information between the mobile drive units 220 and coordinating the movement of mobile drive units 220 within workspace 270. In general, management module 215 may include any appropriate combination of hardware and/or software suitable to provide the described functionality.

Processor 290 is operable to execute instructions associated with the functionality provided by management module 215. Processor 290 may comprise one or more general purpose computers, dedicated microprocessors, or other processing devices capable of communicating electronic information. Examples of processor 290 include one or more application-specific integrated circuits (ASICs), field programmable gate arrays (FPGAs), digital signal processors (DSPs) and any other suitable specific or general purpose processors.

Memory 291 stores processor instructions, inventory requests, reservation information, state information for the various components of inventory system 210 and/or any other appropriate values, parameters, or information utilized by management module 215 during operation. Memory 291 may represent any collection and arrangement of volatile or nonvolatile, local or remote devices suitable for storing data. Examples of memory 291 include, but are not limited to, random access memory (RAM) devices, read only memory (ROM) devices, magnetic storage devices, optical storage devices or any other suitable data storage devices.

Resource scheduling module 292 processes received inventory requests and generates one or more assigned tasks to be completed by the components of inventory system 210. Resource scheduling module 292 may also select one or more appropriate components for completing the assigned tasks and, using communication interface module 298, communicate the assigned tasks to the relevant components. Additionally, resource scheduling module 292 may also be responsible for generating assigned tasks associated with various management operations, such as prompting mobile drive units 220 to recharge batteries or have batteries replaced, instructing inactive mobile drive units 220 to park in a location outside the anticipated traffic flow or a location near the anticipated site of future tasks, and/or directing mobile drive units 220 selected for repair or maintenance to move towards a designated maintenance station.

Route planning module 294 receives route requests from mobile drive units 220. These route requests identify one or more destinations associated with a task the requesting mobile drive unit 220 is executing. In response to receiving a route request, route planning module 294 generates a path to one or more destinations identified in the route request. Route planning module 294 may implement any appropriate algorithms utilizing any appropriate parameters, factors, and/or considerations to determine the appropriate path. After generating an appropriate path, route planning module 294 transmits a route response identifying the generated path to the requesting mobile drive unit 220 using communication interface module 298.

Segment reservation module 296 receives reservation requests from mobile drive units 220 attempting to move along paths generated by route planning module 294. These reservation requests request the use of a particular portion of workspace 270 (referred to herein as a "segment") to allow the requesting mobile drive unit 220 to avoid collisions with other mobile drive units 220 while moving across the reserved segment. In response to received reservation requests, segment reservation module 296 transmits a reservation response granting or denying the reservation request to the requesting mobile drive unit 220 using the communication interface module 298.

The inventory module 297 maintains information about the location and number of inventory items in the inventory system 210. Information can be maintained about the number of inventory items in a particular inventory holder 230, and the maintained information can include the location of those inventory items in the inventory holder 230. The inventory module 297 can also communicate with the mobile drive units 220, utilizing task assignments 218 to maintain, replenish or move inventory items within the inventory system 210.

Communication interface module 298 facilitates communication between management module 215 and other components of inventory system 210, including reservation responses, reservation requests, route requests, route responses, and task assignments. These reservation responses, reservation requests, route requests, route responses, and task assignments may represent communication of any form appropriate based on the capabilities of management module 215 and may include any suitable information. Depending on the configuration of management module 215, communication interface module 298 may be responsible for facilitating either or both of wired and wireless communication between management module 215 and the various components of inventory system 210. In particular embodiments, management module 215 may communicate using communication protocols such as 802.11, Bluetooth, or Infrared Data Association (IrDA) standards. Furthermore, management module 215 may, in particular embodiments, represent a portion of mobile drive unit 220 or other components of inventory system 210. In such embodiments, communication interface module 298 may facilitate communication between management module 215 and other parts of the same system component.

In general, resource scheduling module 292, route planning module 294, segment reservation module 296, inventory module 297, and communication interface module 298 may each represent any appropriate hardware and/or software suitable to provide the described functionality. In addition, as noted above, management module 215 may, in particular embodiments, represent multiple different discrete components and any or all of resource scheduling module 292, route planning module 294, segment reservation module 296, inventory module 297, and communication interface module 298 may represent components physically separate from the remaining elements of management module 215. Moreover, any two or more of resource scheduling module 292, route planning module 294, segment reservation module 296, inventory module 297, and communication interface module 298 may share common components. For example, in particular embodiments, resource scheduling module 292, route planning module 294, segment reservation module 296, and inventory module 297 represent computer processes executing on processor 290 and communication interface module 298 comprises a wireless transmitter, a wireless receiver, and a related computer process executing on processor 290.

Figure 10:
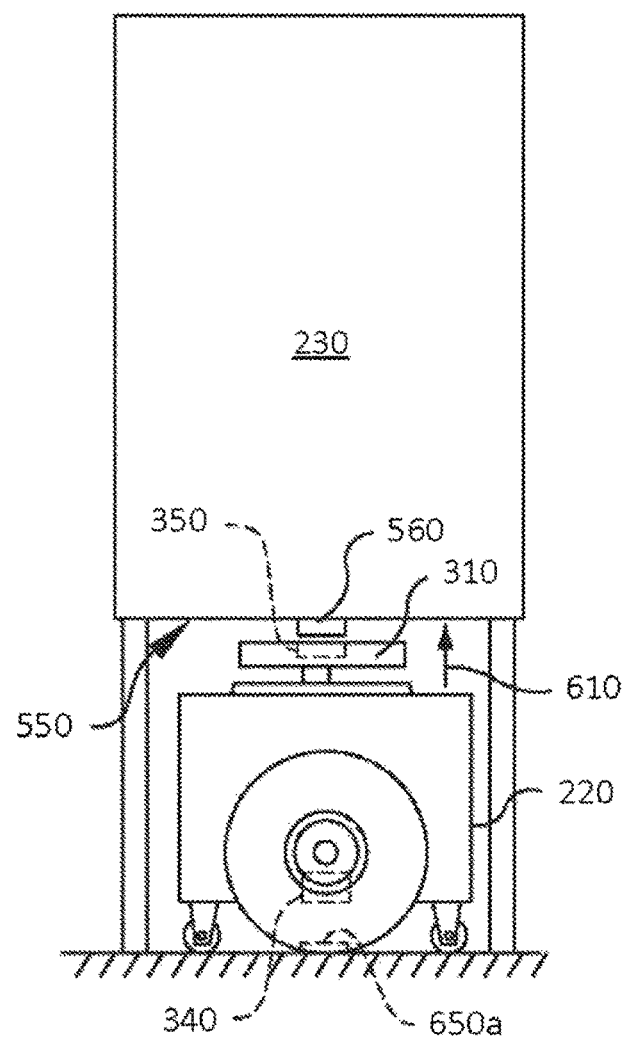
FIG. 10 illustrates a mobile drive unit and an inventory holder, in accordance with many embodiments.

FIG. 10 illustrates operation of a mobile drive unit 220 while docking or undocking with an inventory holder 230. For example, after positioning itself over a fiducial mark 650a, the mobile drive unit 220 begins the docking process. In the illustrated example, the docking process includes the mobile drive unit 220 raising a docking head 310 towards a docking surface 550, as indicated by arrow 610. Additionally, in the illustrated example, the mobile drive unit 220 and the inventory holder 230 are configured so that the mobile drive unit 220 lifts the inventory holder 230 off the ground when the mobile drive unit 220 docks with the inventory holder 230 and, as a result, the mobile drive unit 220 supports the weight of the inventory holder 230 while the mobile drive unit 220 is docked to the inventory holder 230. In the illustrated embodiment, mobile drive unit 220 includes a position sensor 340, and a holder sensor 350. Holder identifier 560 marks a predetermined portion of inventory holder 230 and mobile drive unit 220 may use holder identifier 560 to align with inventory holder 230 during docking and/or to determine the location of inventory holder 230.

As described above, in the context of an order fulfillment network, the approaches and systems described herein enable multi-dimensional configuration management across a diverse set of MHF implementations while minimizing redundant configuration management. For example, at the highest level of a MHF implementation, configuration parameters control the overall behavior of the entire system. For example, configuration parameters can be used to control how users interact with inventor holders and how orders get filled by the MHF system. Configuration parameters can also be used to control aspects such robot behavior and how inventory holders are used by the system. So, for example, one site may be configured for robots to move more slowly than in another site, or to perform more careful inspection of inventory holder locations before docking due to some unique attribute of a site such as poorer condition floors. As another example, configuration parameters can be used to control how much inventory may be stored in each inventory holder based on the requirements of the particular MHF.

Figure 11:
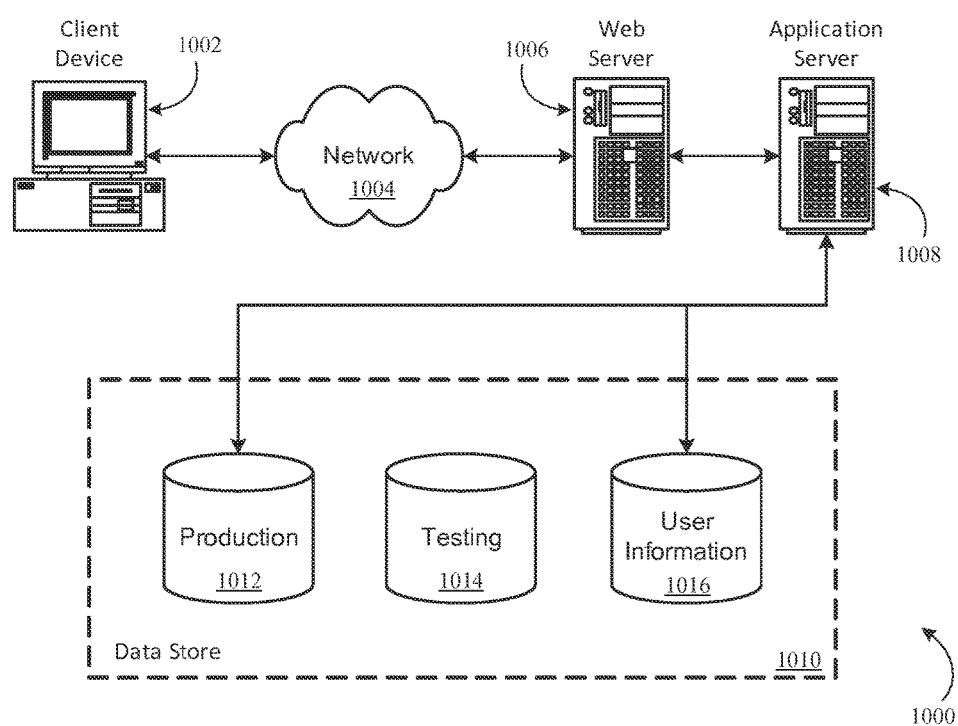
FIG. 11 illustrates aspects of an example environment for implementing aspects in accordance with various embodiments.

FIG. 11 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1000 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing configuration parameters for a computer application implementable on a subset of mobile drive units of a plurality of mobile drive units operating in an inventory workspace, the method comprising:

determining a plurality of different configurations, comprising candidate configuration parameters, values assigned to the candidate configuration parameters, and applicability data indicating a scope of applicability of each of a plurality of the candidate configuration parameters,
 the plurality of different configurations having a respective resulting overall combined set of the candidate configuration parameters,
 the plurality of different configurations including two configurations having different respective overall combined sets of the candidate configuration parameters, and
 the scope of applicability affecting which of the plurality of different configurations is implemented on the subset of mobile drive units of the plurality of mobile drive units operating in the inventory workspace;

receiving a selection of at least two scopes of applicability indicative of a respective at least two subsets of the candidate configuration parameters applicable for a desired implementation configuration for the computer application on the subset of mobile drive units;

receiving additional information regarding the desired implementation configuration, the additional information including at least one of: (a) a software version for the desired implementation configuration, (b) an implementation environment for the desired implementation configuration selected from a group consisting of a production environment and a test environment, or (c) a current time frame or a previous time frame for the desired implementation configuration;

selecting configuration parameters for the computer application on the subset of mobile drive units from the candidate configuration parameters for which the applicability data indicates a scope of applicability matching one of the selected at least two scopes of applicability for the desired implementation configuration and the additional information regarding the desired implementation configuration; and transmitting the configuration parameters for the computer application to the subset of mobile drive units of the plurality of mobile drive units operating in the inventory workspace, the configuration parameters configured to affect a particular implementation of an application of rules of the computer application at the subset of mobile drive units.

2. The computer-implemented method of claim 1, further comprising:
    identifying additional configuration parameters for the desired implementation configuration that are not selected from the candidate configuration parameters based on the selected at least two scopes of applicability for the desired implementation configuration and the additional information regarding the desired implementation configuration; and
    receiving values for defining the identified additional configuration parameters.

3. The computer-implemented method of claim 1, wherein:
    the applicability data includes hierarchically organized scopes of applicability; and
    the selected configuration parameters include configuration parameters for at least one higher level scope of applicability relative to one of the selected scopes of applicability.

4. The computer-implemented method of claim 3, wherein the applicability data comprises:
    a global scope for configuration parameters applicable to each of the plurality of different configurations;
    a plurality of client scopes, each of the client scopes being associated with configuration parameters applicable to a particular client of a plurality of clients;
    a plurality of design scopes, each of the design scopes being associated with configuration parameters applicable to a particular design of a plurality of designs;
    a plurality of site scopes, each of the site scopes being associated with configuration parameters applicable to a particular site of a plurality of sites; and
    a plurality of zone scopes, each of the zone scopes being associated with configuration parameters applicable to a particular zone of a plurality of zones.

5. The computer-implemented method of claim 4, wherein:
    if the selected at least two scopes of applicability for the desired implementation configuration include one of the plurality of client scopes, the selected configuration parameters include:
        candidate configuration parameters having the global scope, and
        candidate configuration parameters having the client scope;
    if the selected at least two scopes of applicability for the desired implementation configuration include one of the plurality of design scopes, the selected configuration parameters include:
        candidate configuration parameters having the global scope,
        candidate configuration parameters having the client scope corresponding to the design scope, and
        candidate configuration parameters having the design scope;
    if the selected at least two scopes of applicability for the desired implementation configuration include one of the plurality of site scopes, the selected configuration parameters include:
        candidate configuration parameters having the global scope,
        candidate configuration parameters having the client scope corresponding to the site scope,
        candidate configuration parameters having a design scope corresponding to the site scope, and
        candidate configuration parameters having the site scope; and
    if the selected at least two scopes of applicability for the desired implementation configuration include one of the plurality of zone scopes, the selected configuration parameters include:
        candidate configuration parameters having the global scope,
        candidate configuration parameters having the client scope corresponding to the zone scope,
        candidate configuration parameters having the design scope corresponding to the zone scope,
        candidate configuration parameters having a site scope corresponding to the zone scope, and
        candidate configuration parameters having the zone scope.

6. A system for managing configuration parameters for a computer application implementable on a subset of mobile drive units of a plurality of mobile drive units operating in an inventory workspace, the system comprising:
    at least one processor; and
    a memory including
        instructions that, when executed by the at least one processor, cause the at least one processor to at least:
        select a plurality of different configurations comprising candidate configuration parameters, values assigned to the candidate configuration parameters, and applicability data indicating a scope of applicability of each of a plurality of the candidate configuration parameters, the scope of applicability affecting which of the plurality of different configurations is implemented on the subset of mobile drive units of the plurality of mobile drive units operating in the inventory workspace;
        receive a selection of at least two scopes of applicability indicative of a respective at least two subsets of the candidate configuration parameters applicable for a desired implementation configuration for the computer application on the subset of mobile drive units;
        receive additional information including at least one of: (a) a software version for the desired implementation configuration, (b) an implementation environment for the desired implementation configuration selected from a group consisting of a production environment and a test environment, or (c) a current time frame or a previous time frame for the desired implementation configuration;
        select configuration parameters from the candidate configuration parameters for which the applicability data indicates a scope of applicability matching one of the selected at least two scopes of applicability for the desired implementation configuration and the additional information regarding the desired implementation configuration; and
        transmit the configuration parameters to the subset of mobile drive units of the plurality of mobile drive units operating in the inventory workspace, the configuration parameters configured to affect a particular implementation of an application of rules of the computer application at the subset of mobile drive units.

7. The system of claim 6, wherein the instructions, when executed by the at least one processor, cause the at least one processor to:
    identify additional configuration parameters for the desired implementation configuration that are not selected from the candidate configuration parameters based on the selected at least two scores of applicability for the desired implementation configuration; and receive values for defining the identified additional configuration parameters.

8. The system of claim 7, wherein the instructions, when executed by the at least one processor, cause the at least one processor to apply the selected configuration parameters to the subset of mobile drive units configured to run the desired implementation configuration for the computer application.

9. The system of claim 7, wherein the instructions, when executed by the at least one processor, cause the at least one processor to compare the selected configuration parameters to configuration parameters of a running instance of the computer application to identify differences there between.

10. The system of claim 6, wherein the instructions, when executed by the at least one processor, cause the at least one processor to:

receive a selection of a computer platform on which the desired implementation configuration for the computer application is to be implemented; and at least one of: (a) select one or more configuration parameters from the candidate configuration parameters based on the selected computer platform, or (b) identify one or more configuration parameters corresponding to the selected computer platform that are not selected from the candidate configuration parameters based on the selected computer platform.

11. The system of claim 6, wherein the instructions, when executed by the at least one processor, cause the at least one processor to:

receive a selection of a software version of the computer application for the desired implementation configuration; and at least one of: (a) select one or more configuration parameters from the candidate configuration parameters based on the selected software version, or (b) identify one or more configuration parameters corresponding to the selected software version that are not selected from the candidate configuration parameters based on the selected software version.

12. The system of claim 6, wherein the instructions, when executed by the at least one processor, cause the at least one processor to:

receive a selection of an implementation environment for the desired implementation configuration of the computer application, the implementation environment selected from the group consisting of a production environment and a test environment; and at least one of: (a) select one or more configuration parameters from the candidate configuration parameters based on the selected implementation environment, or (b) identify one or more configuration parameters corresponding to the selected implementation environment that are not selected from the candidate configuration parameters based on the selected implementation environment.

13. The system of claim 6, wherein the instructions, when executed by the at least one processor, cause the at least one processor to:

receive a selection of a time frame for the desired implementation configuration, the selected time frame being a current time frame or a prior time frame; and at least one of: (a) select one or more configuration parameters from the candidate configuration parameters based on the selected time frame, or (b) identify one or more configuration parameters corresponding to the selected time frame that are not selected from the candidate configuration parameters based on the selected time frame.

14. The system of claim 6, wherein:

the applicability data includes hierarchically organized scopes of applicability; and the selected configuration parameters include configuration parameters for at least one higher level scope of applicability relative to one of the selected scopes of applicability.

15. The system of claim 6, wherein the applicability data includes non-hierarchical scopes of applicability.

16. A non-transitory computer-readable storage medium storing computer-executable instructions for managing configuration parameters for a computer application implementable on a subset of mobile drive units of a plurality of mobile drive units operating in an inventory workspace that, when executed by at least one processor, causes the at least one processor to at least:

select scope-aware configuration data comprising candidate configuration parameters, values assigned to the candidate configuration parameters, and applicability data indicating a scope of applicability of each of a plurality of the candidate configuration parameters, the scope of applicability affecting which of the scope-aware configuration data is implemented on a subset of mobile drive units of a plurality of mobile drive units operating in an inventory workspace;

receive a selection of at least two scopes of applicability for a desired implementation configuration for a computer application implementable in a plurality of different configurations, each of the plurality of different configurations having a respective resulting overall combined set of the candidate configuration parameters, the plurality of different configurations including two configurations having different respective overall combined sets of the candidate configuration parameters;

receive designation information including at least one of: (a) a software version for the desired implementation configuration, (b) an implementation environment for the desired implementation configuration selected from a group consisting of a production environment and a test environment, or (c) a current time frame or a previous time frame for the desired implementation configuration;

select configuration parameters from the scope-aware configuration data including the candidate configuration parameters, values assigned to the candidate configuration parameters, and applicability data indicating a scope of applicability of each of a plurality of the candidate configuration parameters, the applicability data indicating a scope of applicability for each of the selected configuration parameters matching one of the selected at least two scopes of applicability and the designation information regarding the desired implementation configuration; and transmit the configuration parameters to the subset of mobile drive units of the plurality of mobile drive units operating in the inventory workspace, the configuration parameters configured to affect a particular implementation of an application of rules of the computer application at the subset of mobile drive units.

17. The non-transitory computer-readable storage medium of claim 16, wherein the computer-executable instructions, when executed by at least one processor, further causes the at least one processor to at least compare the selected configuration parameters to configuration parameters of a running instance of the computer application to identify differences there between.

18. The non-transitory computer-readable storage medium of claim 17, wherein the computer-executable instructions, when executed by at least one processor, further causes the at least one processor to at least update or add to the candidate configuration parameters to reflect at least one of the identified differences between the selected configuration parameters and configuration parameters of the running instance of the computer application.

19. The non-transitory computer-readable storage medium of claim 16, wherein the computer-executable instructions, when executed by at least one processor, further causes the at least one processor to at least receive an override of at least one of the selected configuration parameters.

20. The non-transitory computer-readable storage medium of claim 16, wherein the computer-executable instructions, when executed by at least one processor, further causes the at least one processor to at least one of:
    select one or more configuration parameters from the candidate configuration parameters based on the designation information.

\* \* \* \* \*